United States Patent [19]

Polak

[11] Patent Number: 5,065,964
[45] Date of Patent: Nov. 19, 1991

[54] CORD CADDIE

[76] Inventor: Comer F. Polak, 6470 Seagull Dr. #307, Bradenton, Fla. 34210

[21] Appl. No.: 618,481

[22] Filed: Nov. 27, 1990

[51] Int. Cl.[5] .............................................. F16L 3/00
[52] U.S. Cl. ..................................... 248/51; 248/205.2
[58] Field of Search ............. 248/51, 52, 205.2, 117.1

[56] References Cited

U.S. PATENT DOCUMENTS

| | | | |
|---|---|---|---|
| 1,599,124 | 9/1926 | Fisler | 248/52 X |
| 1,665,316 | 4/1928 | Matthews | 248/51 |
| 2,506,246 | 5/1950 | Stovers | 248/51 |
| 3,214,851 | 11/1965 | Webster | |
| 3,250,030 | 5/1966 | LaPastora | 248/51 X |
| 3,266,760 | 8/1966 | Edelman | 248/51 |
| 3,321,068 | 5/1967 | Beach | 248/205.2 X |
| 3,481,570 | 12/1969 | Shettel | 248/51 |
| 3,866,869 | 2/1975 | Woods | 248/51 |
| 4,612,717 | 9/1986 | Alvarez | 248/51 X |
| 4,815,683 | 3/1989 | Ferrante | 248/205.2 |

Primary Examiner—Ramon O. Ramirez

[57] ABSTRACT

A device of two parts to control the cord of an electric iron during the process of ironing fabric on a common ironing board. The first part is a strap with a loop to position the iron's cord on the board. The second part is a weight to pull the iron's cord in reverse.

2 Claims, 2 Drawing Sheets

CORD CADDIE

BACKGROUND

1. Field of Invention

This invention relates to retainers for an electric iron cord when used to iron fabric on a common ironing board.

2. Description of Prior Art

In the process of ironing fabric on a common ironing board, the cord of an electric iron often interferes with the movement of the iron. The cord often wrinkles the already-ironed fabric. The cord is a necessary, but frustrating and inconvenient, appendage to an iron. It simply gets in the way.

Several solutions have been invented to reduce interference from the iron's cord. U.S. Pat. No. 3,214,851 to Webster (1965) shows a stand to hold the iron's cord. The stand is an accessory to an ironing board. It is bulky, hard to store and relatively complicated to assemble and use.

U.S. Pat. No. 1,665,316 to Matthews (1928)
U.S. Pat. No. 2,506,246 to Stovers (1950)
U.S. Pat. No. 3,266,760 to Edelman (1966)
U.S. Pat. No. 3,250,030 to Lapastora (1966)
U.S. Pat. No. 3,481,570 to Shettel (1969)
U.S. Pat. No. 3,866,869 to Woods (1975)

are similar inventions in that all of them are attached to an ironing board with a clamping mechanism. They must be assembled for each use or left on the board permanently. They create wear and tear on the board's cover. When in use, they are obstructions in and of themselves as they take up space on the board. They are awkward to assemble and store.

U.S. Pat. No. 4,612,717 to Alvarez (1986) continues to improve on a solution to the problem of interference from an iron's cord. The retaining guide is a ring with working parts which is attached to a special cover for an ironing board in various ways. The main disadvantage of this invention is the cover itself which is an integral part of the retaining device. The cover is limited to a standard-sized board and is intended to remain on the board. No other cover can be used with the restraining ring. With use, ironing board covers deteriorate and the entire assembly must be replaced. Mechanical locking rings can break.

None of the above inventions address the advantage of being able to use covers made of various types of fabrics on the same board. It is a benefit to be able to change the cover quickly. Muslin covers are best used in clothing construction, slippery covers for household ironing.

OBJECTS AND ADVANTAGES

In order to further solve the problem of interference from an electric iron's cord, several advantages of the present invention are:

(a) to provide a retaining device that fits any ironing board of any size and/or shape;

(b) to provide a restraining device that can be used with any existing cover;

(c) to provide a restraining device that is durable and has no working parts;

(d) to provide a restraining device that is easily moved from one ironing board to another;

(e) to provide a restraining device that is not an obstruction in itself;

(f) to provide a restraining device that can be carried about and stored in a very small area;

(g) to provide a restraining device that is simple to install and use;

(h) to provide a restraining device that is inexpensive and easy to manufacture;

(i) to provide a restraining device that allows a board cover to be changed quickly without dismantling the retaining guide.

REFERENCE NUMERALS IN DRAWINGS

| | |
|---|---|
| 10 ironing board | 22 electric outlet |
| 12 electric iron | 24 right edge of strap |
| 14 cord of iron | 26 left edge of strap |
| 16 flat elastic strap | 28 joint |
| 18 loop | 30 seam 1 |
| 20 weight | 32 seam 2 |

BEST MODE FOR CARRYING OUT THE INVENTION

Figure 1:
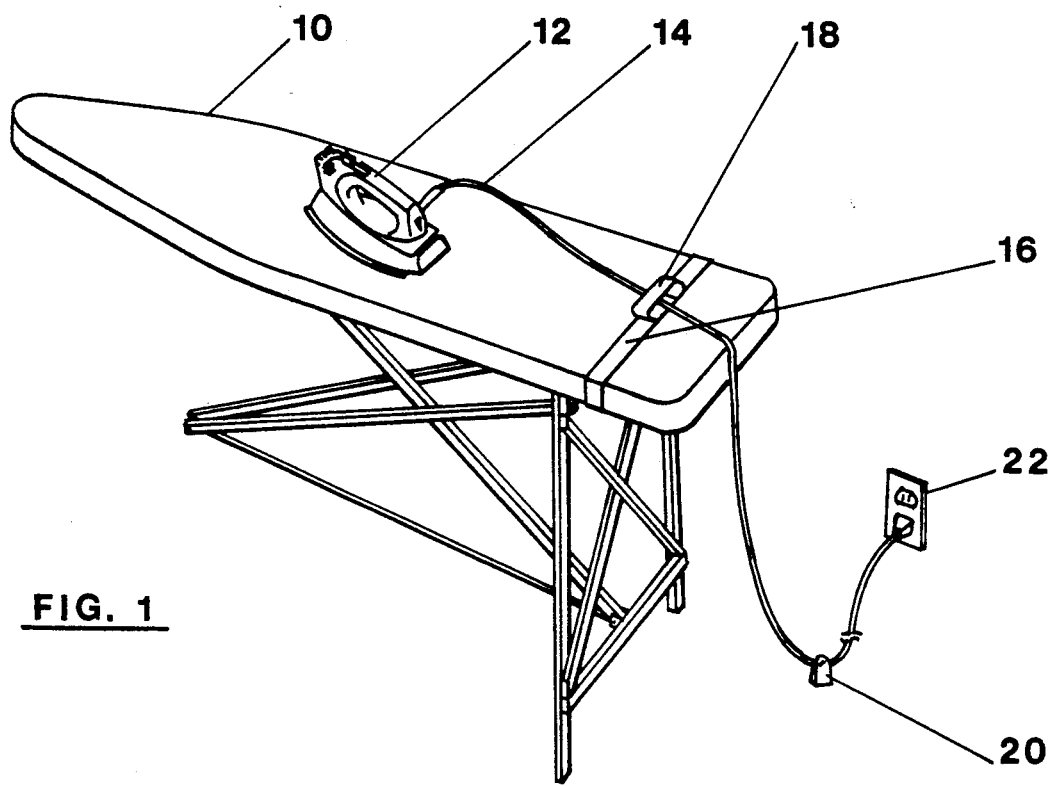
FIG. 1 is a perspective view showing the present invention in an operational mode.

The typical embodiment of the invention is illustrated in FIG. 1. The ironing board 10 is assembled for use. The flat elastic strap 16 is shown stretched around the wide end of the ironing board 10. The loop 18 is on top of the board 10. The cord of the iron 14 is illustrated as inserted through the loop 18 and plugged into an electric outlet 22. The iron 12 is shown resting on the board 10. In use, the loop 18 restricts the cord of the iron 14 to the end of the board 10. When the iron 12 is moved to the left, the cord 14 is drawn through the loop 18, restraining the cord 14 on top of the board 10. In reverse, when the iron 12 is moved to the right, a weight 20 pulls the cord of the iron 14 back across the board 10, through the loop 18, and down to the floor. The cord of the iron 14 does not tangle and remains taut throughout the operation.

Figure 2:
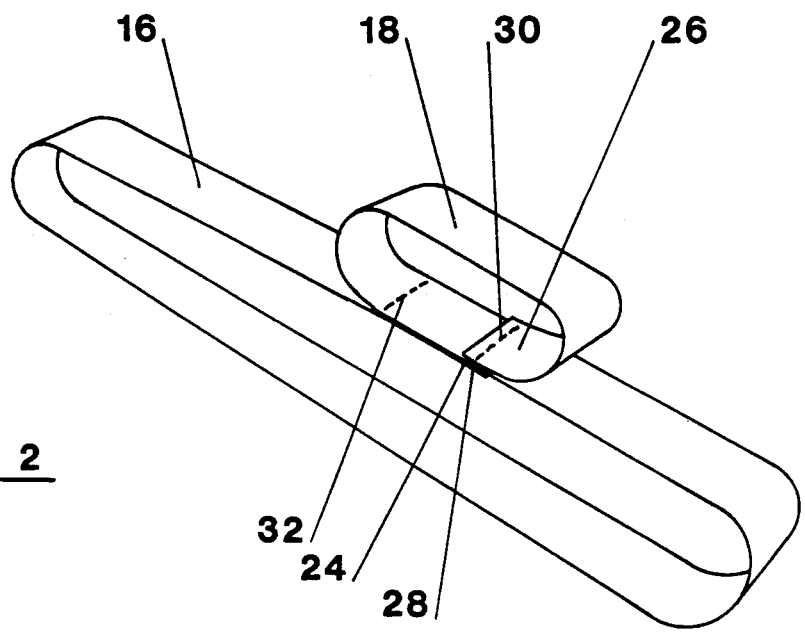
FIG. 2 is a detailed perspective view of the invention
Figure 2A:
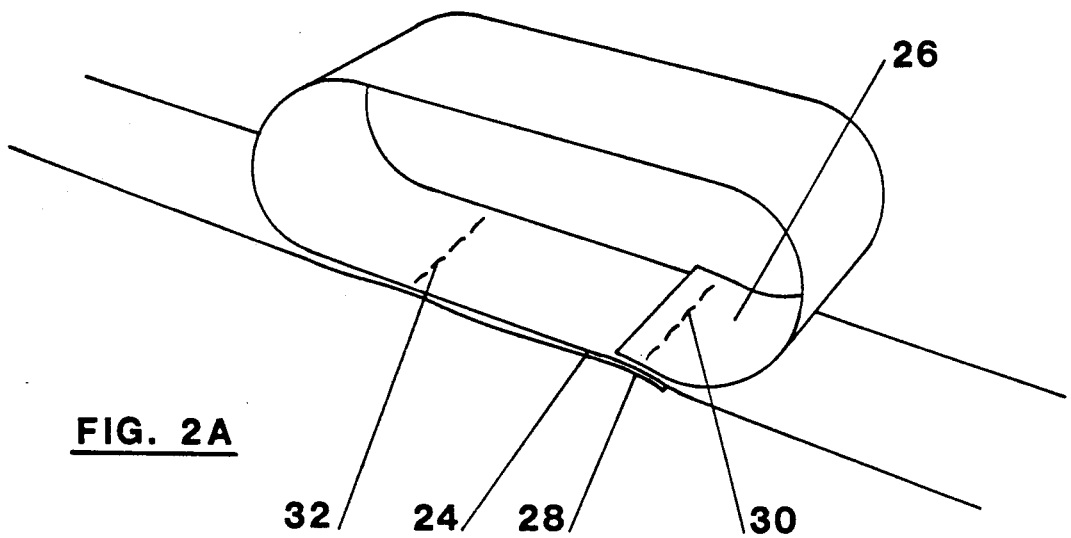
FIG. 2A is an enlarged view of the loop assembly of the invention.

The invention is illustrated in FIG. 2 and FIG. 2A. The flat elastic strap 16 is made from common flat, textiled elastic ribbon. The strap 16 is one inch wide and 27½ inches long. The loop 18 is fashioned at the joint 28 in the following manner:

(a) The joint 28 is six inches from the left edge of the strap 26;

(b) The right edge of the strap 24 is brought to the left back over the strap 16 and placed at the joint 28.

(c) The left edge of the strap 26 is brought to the right, overlapping the right edge of the strap 24 by several inches;

(d) The left edge of the strap 26 is turned under itself so as the left edge of the strap 26 is even with the right edge of the strap 24 at the joint 28, forming the loop 18;

(e) A ⅜ inch seam 30 is stitched at the joint 28 through three layers of the strap 16 inside the just-formed loop 18; The strap 16 has been configured as a circle and is opened out.

(f) The loop 18 is positioned to the left side of the seam 30 on top of the strap 16;

(g) A second seam 32 is stitched on the inside of the loop 18 through two layers of the strap 16 at a point 2½ inches to the left of the first seam 30.

SUMMARY OF THE INVENTION

As pointed out above, this invention retains and retracts the cord of an electric iron when the iron is used on a common ironing board. A narrow, flat elastic strap is stretched around the wide end of an ironing board. A small, built-in loop remains on top of the board. The plug of an iron is inserted through the loop and then plugged into an electric outlet. A weight is fastened to the iron's cord with Velcro tabs. This invention improves on previous solutions to the problem of an iron's cord impeding the use of an electric iron in the following ways:

(a) It can be used in conjunction with existing products;

(b) It will fit any ironing board;

(c) It can be used with any cover;

(d) It does not impede the changing of the board cover;

(e) It is simple to use;

(f) It requires no assembly;

(g) It provides an inexpensive solution to an existing need;

(h) It is extremely durable and reliable;

(i) It does not in and of itself constrict the use of the iron;

(j) It has been enthusiastically received in the commercial market;

(k) It is attractive in appearance.

It can be seen that the invention provides a highly reliable, durable and economical means to restrain and retract the cord of an electric iron during the process of ironing.

I claim:

1. A retaining guide for an electric iron cord extending between an electric power outlet and an electric iron atop an ironing board having a top surface, a narrow end and a wider end, said retaining guide comprising:

a narrow flat elastic strap adapted to be stretched to encircle said wide end, said strap having an integral loop adapted to receive said electric cord to keep the cord on the top surface of the iron board, and a weight attached to the electric cord between the strap and the electric outlet to maintain the cord relatively taut.

2. A retaining guide as recited in claim 1 wherein the weight is attached to the cord by mechanical interlocking fabric means.

* * * * *